United States Patent

[11] 3,617,130

[72] Inventors Joseph G. Kelley
 Wayland, Mass.;
 Robert A. Hargreaves, Nashua, Md.
[21] Appl. No. 883,710
[22] Filed Dec. 10, 1969
[45] Patented Nov. 2, 1971
[73] Assignee The United States of America as
 represented by the Air Force

[54] SIMPLIFIED SCHLIEREN SYSTEM
 4 Claims, 2 Drawing Figs.
[52] U.S. Cl. .................................................. 356/107,
 356/129
[51] Int. Cl. ................................................. G01b 9/02,
 G01n 21/46
[50] Field of Search ................................... 356/106–107;
 350/13

[56] References Cited
UNITED STATES PATENTS
2,636,415 4/1953 Zobel ........................... 356/107
2,712,265 7/1955 Ingelstam ..................... 350/13 X Primary Examiner—Ronald L. Wibert
Assistant Examiner—Conrad Clark
Attorneys—Harry A. Herbert, Jr. and Arsen Tashjian ABSTRACT: A beam of coherent light is expanded and reparallelized by a single lens and a parabolic mirror. The beam then passes through the test region, which may be of any convenient size and impinges on a back surface mirror at 45 degrees. About 10 percent of the light is reflected from the front surface of the glass. This is slightly offset from the image reflected from the rear surface. Any refractive index gradients perpendicular to the direction of propagation then create fringes in the overlapping reflected images which may be visually observed or recorded directly on film.

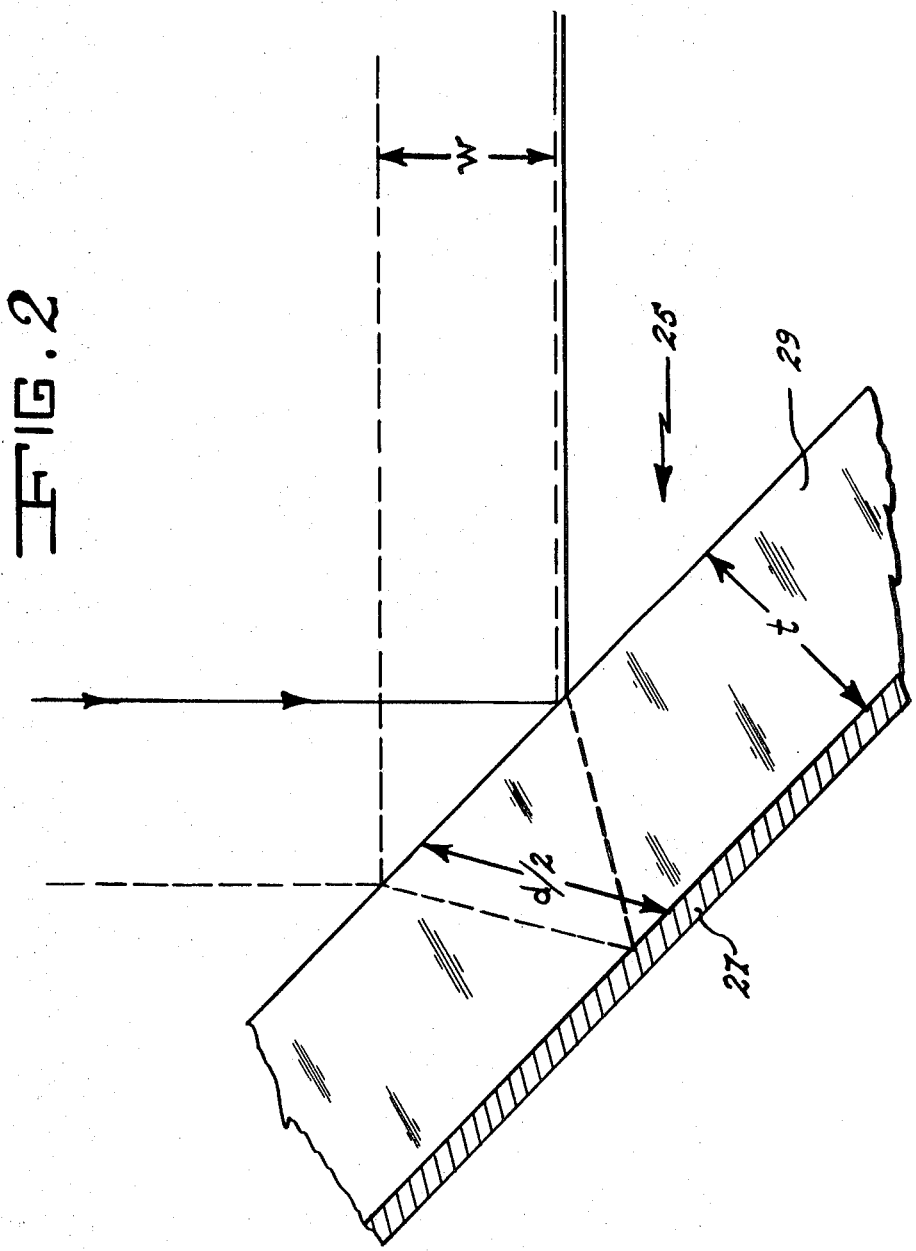

000# SIMPLIFIED SCHLIEREN SYSTEM

BACKGROUND OF THE INVENTION

This invention relates to a system for rendering visible a phase object such as a density gradient whose index of refraction differs from that of its surroundings and, more particularly, the invention is concerned with providing a simplified optical system for achieving visual perception of a phase object by causing coherent light to pass through a test region and impinge at a 45-degree angle on a back surface test mirror and observing the fringes created by overlapping offset reflections from the front and back surfaces of the mirror.

A significant problem commonly encountered in various research and design projects is the visualization of phase objects. A phase object can be defined as something whose refractive index is different from that of its surroundings. Ordinarily, such an object is invisible. For example, the density gradients created by shock and expansion waves in the airflow around a wind tunnel model are generally difficult to observe or photograph.

Heretofore, the most common optical technique for detecting density gradients occurring in gas flow and shock fronts was the schlieren system. This optical system includes a source of light which is shielded so that only a small rectangular slit emits light. A lens is placed at its focal distance from the slit so that the light is bent into a parallel beam. A second lens collects the parallel beam into an image of the slit and forms an inverted image on the screen or photographic plate. If a knife edge is moved into the light stream near the slit image, the image darkens uniformly.

In a typical application, the schlieren system described above is oriented so that the parallel light beam crosses a wind tunnel section. A light ray bent from the parallel path by density gradients in the test section cannot be brought into focus at the slit image and is interrupted by the knife edge so that a dark spot appears at a point on the screen. Another light ray deflected the opposite way by a different density gradient escapes the knife edge and appears as a light spot on the screen. Thus, a picture of the density gradients appears on the screen.

The disadvantages of the above-described prior art system include the requirement of critical adjustments and an extremely stable setup so that the elements are not sensitive to shock. Also the typical schlieren system requires that the phase object be within a certain specific area in the optical system. This limits the size and restricts the position of the test region.

The observing plane in the usual schlieren photography system is fixed by the relation between the test and reference beams of the system and sometimes changes during normal operation because of uncontrollable heating or vibration conditions. The phase object to be observed must be in the focal range of the optical system in order to obtain a reasonably clear picture of the phase object. Thus, it can be seen that presently known systems for making phase objects visible are generally expensive, delicate, and complicated to produce and require operation by skilled and experienced personnel to obtain satisfactory results.

SUMMARY OF THE INVENTION

The present invention provides a schlieren system which is simple, rugged and inexpensive and requires no critical adjustments. The setup is not shock sensitive and the test space is virtually unlimited.

In a preferred embodiment of the invention, a laser provides a parallel beam of coherent light. A shutter is placed in front of the light for exposure control. The light then passes through a divergent lens which is positioned to be confocal with a parabolic mirror which reflects the parallel light beam through the test region to a back surface test mirror. The overlapping beams from the test mirror then impinge on the film to expose it and produce the schlieren image thereon.

Accordingly, it is an object of the invention to provide schlieren photography system which is simple, rugged and inexpensive to build and which can be set up and operated by a person with minimal skills in the field of optics to obtain results equal to or superior to those obtained by more complicated and less stable systems.

Another object of the invention is to provide a schlieren system wherein a test mirror is utilized to divide the parallel beam into reference and test beams.

A further object of the invention is to provide an optical system for rendering a phase object visible wherein the phase object may be positioned anywhere within the test region.

A still further object of the invention is to provide a schlieren system wherein the test region may be any arbitrary size and may be varied during operation.

Another still further object of the invention is to provide a novel optical system for observing a phase object wherein the phase object to be observed may be of any arbitrary depth since no focal distance are involved in the observations.

The observing plane may be at any arbitrary, variable distance from the test mirror, the relation between test and reference beams being maintained entirely by the angle and thickness of the test mirror.

Still another object of the invention is to provide a schlieren photography system wherein moire effects may be added if desired by misadjustment of the beam-expanding optics.

These and other objects, features and advantages will become more apparent after considering the description that follows taken in conjunction with the attached drawings wherein like numbers are used throughout to identify like elements.

DESCRIPTION OF THE DRAWINGS

FIG. 2 is a schematic view in detail of the back surface mirror showing the action of the light rays which produce the test and reference beams.

DESCRIPTION OF A PREFERRED EMBODIMENT

Figure 1:
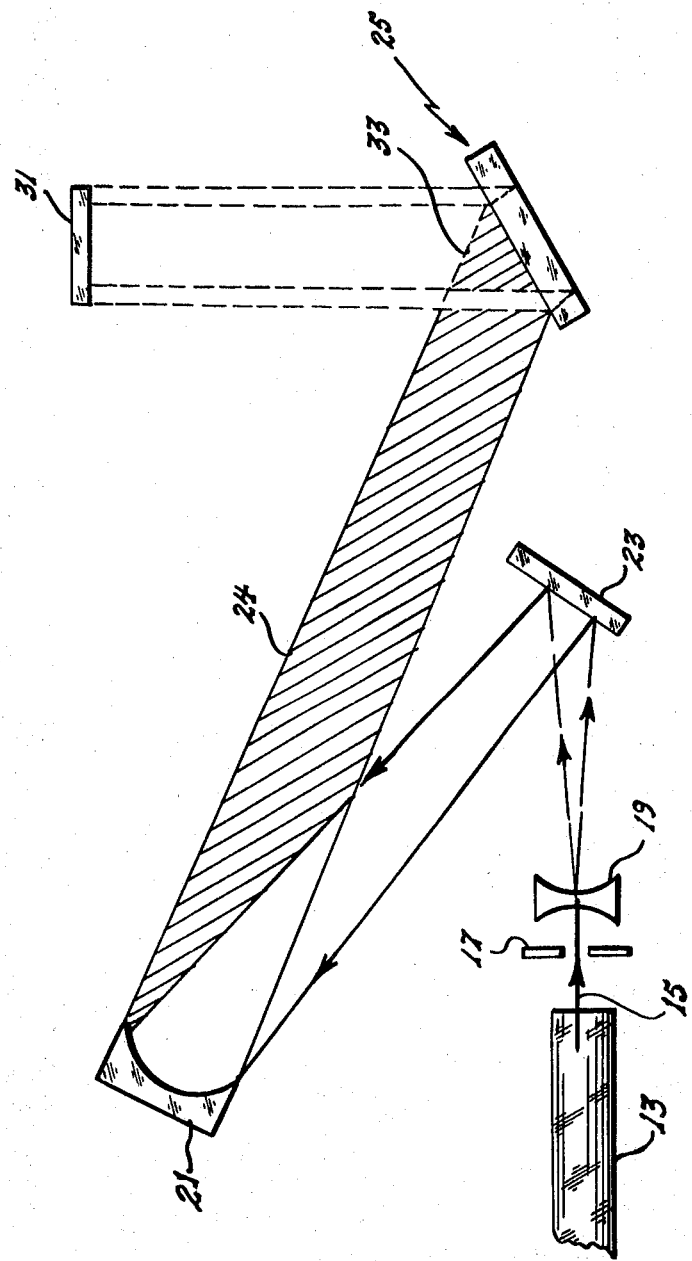
FIG. 1 is a schematic plan view of a schlieren system according to our invention showing a laser light source with the associated optical elements arranged to produce a visible image of a phase object.

Referring now to the drawings, there is shown a laser 13 which provides a parallel beam of coherent light 15. A coherence of a few centimeters is sufficient. A shutter 17 is placed in front of the light source for exposure control. A divergent lens 19, with a focal length of a few centimeters, is adjusted to be confocal with a 6-inch diameter parabolic mirror 21. A plane mirror 23 is positioned at an angle in the light beam between the lens 19 and the parabolic mirror 21 and directs the diverging light beam toward the parabolic mirror 21.

The parallel light beam from the parabolic mirror 21 passes through the test region 24 and impinges on the test mirror 25 which is set at an angle to the beam. The phase object to be tested is positioned in the test region 24. The test mirror 25, which is shown enlarged in FIG. 2, is a back surface mirror, that is, the silvered surface 27 is under the glass 29. A small portion, about 10 percent, of the incident light is reflected from the front surface of the mirror 25. This reflection is slightly offset relative to the main reflection from the back surface 27. Any gradients in the refractive index of the test region 24 perpendicular to the direction of propagation will create fringes in the overlapping reflected images. These may be visually observed or recorded directly on a sheet of film 31 placed in the reflected beam. None of the dimensions or adjustments are especially critical.

The crosshatched region 33 which is illuminated by both the incident and the reflected beams is of particular interest. An object placed in this region will cause a schlieren image since it is in the test region. There will also be a shadowgraph image due to the object's effect on the reflected beam. The shadowgraph is created by the bending of rays out of the beam at regions where the index of refraction changes rapidly.

The test mirror 25, shown in FIG. 2, which forms the heart of the hereinbefore-described schlieren system, can be an ordinary back surface mirror, that is, a sheet of glass 29 backed by a reflecting surface 27. A ray of light is incident upon this glass. Two rays are reflected from it, one from the front surface and one from the back surface. These rays are separated by width $w$ which can be calculated from the thickness of the glass $t$ and the angle of incidence. The reflection from the back surface 27 will coincide with the front surface reflection of an incident ray which is a distance $w$ from the first ray. The first ray will have traveled a distance $d$ times the index of refraction of the glass further than the second ray. In this discussion we have assumed that the two surfaces of the glass are parallel. This assumption is probably fairly good. However, if the surfaces are not parallel, the same general principles will apply.

While especially useful for shock tube pictures, the schlieren system described herein is equally applicable to wind tunnels or field experiments or elsewhere where it is desired to render a phase object visible. These objects can include gas flows, thermal currents, shock fronts, ionization waves, etc. In many of these applications it was heretofore difficult or impossible to maintain separate test and reference beams. In the present system it is unnecessary since only one beam is used. There is no requirement to maintain particular stability between the light source and the observation point. It is only required that the beam reach the observation point.

Although the invention has been illustrated in the accompanying drawings and described in the foregoing specification in terms of a preferred embodiment thereof, the invention is not limited to this embodiment or to the particular configuration mentioned. It will be apparent to those skilled in the art that our invention is readily adaptable to field use to observe flows around and behind aircraft on the ground and in the air, as well as such natural phenomena as clear air turbulence. In these cases widely separated ground stations, aircraft stations and/or satellites would be required.

Also, it should be understood that various changes, alterations, modifications and substitutions with respect to the construction details can be made in the arrangement of the several elements without departing from the true spirit and scope of the appended claims.

Having thus described our invention, what we claim as new and desire to secure by Letters Patent of the United States is:

1. A schlieren system for rendering visible a phase object in a test region comprising, a light source for producing a beam of coherent light, a divergent lens positioned in said light beam for expanding said light beam, a parabolic mirror positioned to receive and reparallelize said light beam, said parabolic mirror directing said reparallelized light beam through the test region, mirror means positioned opposite said parabolic mirror for receiving the reparallized beam after passing through the test region, said mirror means dividing said beam into overlapping reference and test beams, and film means in optical alignment with said mirror means for recording the overlapped images in the reference and test beams to produce a visible record of the phase object in the test region.

2. The schlieren system defined in claim 1 wherein the light source for producing the coherent light beam is a laser.

3. The schlieren system defined in claim 2 wherein a shutter is positioned in said coherent light beam between said light source and said divergent lens.

4. The schlieren system defined in claim 2 wherein the mirror means for receiving the reparallelized light after passing through the test region includes a back surface mirror set at an angle to the beam such that a small portion of the light is reflected from the front surface of the mirror thereby producing a reflection slightly offset relative to the main reflection from the back surface of the mirror.

* * * * *